Oct. 31, 1967
G. F. BUSH ET AL
3,350,536
METHOD FOR JOINING METAL SHEETS
Filed Aug. 3, 1964
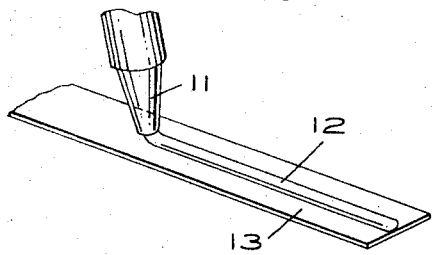
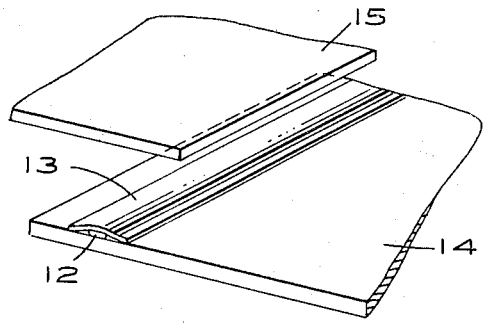
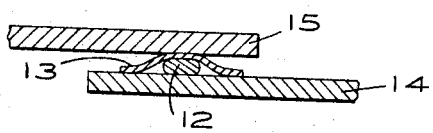
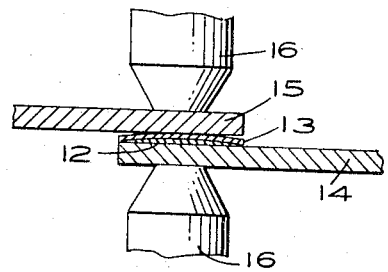
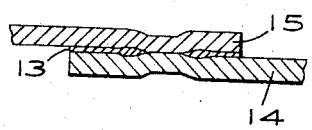
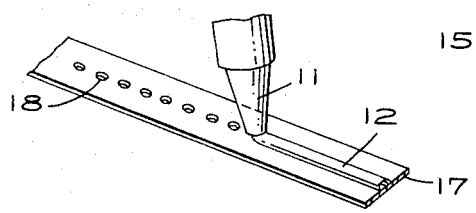
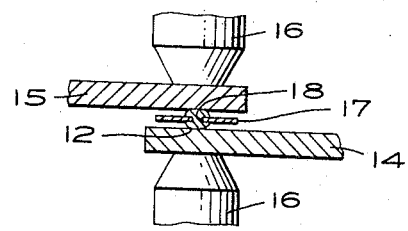
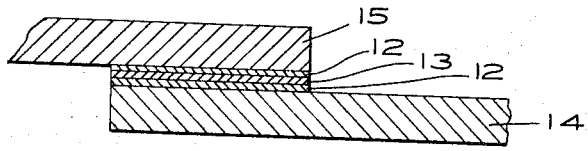
G. FREDERICK BUSH
FREDERICK R. COTTON
JULES I. CRUCHET
INVENTORS
BY John R. Faulkner
Jerry G. Beck
ATTORNEYS

United States Patent Office 3,350,536
Patented Oct. 31, 1967

3,350,536
METHOD FOR JOINING METAL SHEETS
G. Frederick Bush, Detroit, Frederick R. Cotton, Farmington, and Jules I. Cruchet, Dearborn Heights, Mich., assignors to Ford Motor Company, Dearborn, Mich., a corporation of Delaware
Filed Aug. 3, 1964, Ser. No. 387,055
11 Claims. (Cl. 219—92)

ABSTRACT OF THE DISCLOSURE

A bead of weld through sealer is applied to a ribbon of material and the ribbon with the sealer is located on the faying surface of a metal panel so the sealer adheres the ribbon to the panel. A second panel then is positioned with its faying surface overlapping the ribbon. Pressure is applied to the faying surfaces of the panels and electric current is passed through the joint to produce a weld.

---

This invention relates to a method of joining metal sheets and more particularly to a method of spot welding two metal panels together and sealing the spot welded joint.

In large scale spot welding operations such as are commonly conducted in the fabrication of automobile bodies, a sealing composition is usually applied to one face of a sheet metal panel before it is spot welded to another panel to form a body structure. The sealing composition is required to protect the resultant joint against the ingress of water, dust, and dirt. This is accomplished by pumping the sealer through a hose to a nozzle and then manually moving the nozzle to place the extruded bead of sealer on the faying surface of the panel. This method of applying sealer is inherently inconsistent, especially when sealer application is made in the course of high-speed assembly operation.

Very frequently, the bead of sealer is noncontinuous as the operator may skip portions of the surface when applying the bead or the extruded bead may be too thin so as not to provide sufficient sealing capability for the joint. If too much sealer is applied, the faying surface may be flooded so as to cause excess sealer to be forced from the joint during the application of welding pressure. Overflown sealer will interfere with the final painting of the completed body structure.

To overcome these disadvantages, the method of this invention has been devised. In a preferred embodiment, the first step comprises the application of a uniform, continuous bead of sealer to a continuous ribbon made from a conductive material such as zinc or aluminum foil. This step can be performed by automatic pumping equipment remote from the main production area prior to the spot welding operation of the sheet metal panels. This will permit close control so as to effect a uniform and consistent bead of sealer as it is not directly applied to the sheet metal panel on the production line.

When the sheet metal components to be joined by welding have been conveyed to the welding station, the operator picks up a sufficient length of ribbon with sealer adhered thereto and applies it to the faying surface of one of the metal panels. The adhesive property of the sealer brings about the adherence of the ribbon to the surface. A second panel, which is to be joined to the first panel, is positioned so as to overlap the faying surface of the first panel with the sealer and ribbon disposed therebetween. Then pressure is applied and a welding current is passed through the overlapping metal panels until they are joined. The sealer disposed between the panels will flow under the applied pressure so as to provide a continuous seal for the entire length of the joint.

Accordingly, the principal object of this invention is to provide a method for joining two metal panels in which the resultant joint is adequately sealed.

A further object of this invention is to provide a method that will effect a high-quality sealed joint by establishing a bead of sealer of controlled consistency on a sheet metal panel before it is welded to a second panel.

A still further object of this invention is to provide a method that permits the placing of a continuous, uniform bead of sealer on a conductive ribbon remote in time and place from the welding operation.

Other objects and advantages of this method will become more apparent as the description proceeds, particularly when considered in conjunction with the drawings in which:

FIGURE 1 is a perspective view showing the application of a bead of sealer on a ribbon;

FIGURE 2 is an exploded view showing two sheet metal panels about to be brought together for welding;

FIGURE 3 is a vertical section depicting two overlapped sheet metal panels with the ribbon and sealer disposed therebetween;

FIGURE 4 is a view similar to FIGURE 3 but with the panels held between two electrodes;

FIGURE 5 is a sectional view showing two panels which have been joined by welding;

FIGURE 6 is a perspective view of a second embodiment of this invention depicting the application of a bead of sealer to a perforated ribbon;

FIGURE 7 is a vertical section of the embodiment of FIGURE 6 and with the ribbon and sealer interposed between two sheet metal panels; and, FIGURE 8 is a vertical section depicting a third embodiment of this invention in which two sheet metal panels are overlapped prior to welding with a ribbon having a bead of sealer applied to each side thereof being disposed between the panels.

Referring now to FIGURE 1, a nozzle 11 is shown from which a bead of sealer 12 is extruded. This bead is applied to one face of an endless ribbon 13 by moving the nozzle 11 along the longitudinal center line of the ribbon 13. The sealer 12 may be fed under pressure from a storage drum through a hose (not shown) to the nozzle 11. The sealer 12 can also be readily applied to the face of the ribbon 13 by brushing, knifing, flowing, or spraying, if desired. The bead of sealer is commonly between ⅛ inch to ³⁄₃₂ inch wide with the ribbon 13 being of a sufficient width to accommodate the bead.

The sealer material, which is conventional, is commonly referred to as a "weld-through sealer." The sealer 12 is formed from a smooth, homogenous, pasty or mastic material that has adhesive and wash-resistant properties and, preferably, also is conductive to permit passage of welding current therethrough.

Typical ingredients for a sealer for this application are as follows:

| Ingredients: | Percentage by weight |
|---|---|
| Cellulose nitrate or other thermoplastic resin | 17.3 |
| Butyl acetate | 9.5 |
| Butyl lactate | 6.6 |
| Glycol-mono-ethyl-ether | 6.6 |
| Glycol-mono-methyl-ether | 6.6 |
| Castor oil | 48.0 |
| Aluminum flakes, varnish grade | 4.5 |
| Acetylene carbon black | 0.6 |
| Di cyclohexylamine | 0.3 |
| | 100.0 |

In FIGURE 2 is seen sheet metal panels 14 and 15, the margins of which are to be joined by spot welding. The ribbon 13 with the sealer 12 adhered thereto is cut to length to fit the panel 14 and then applied to the faying surface of panel 14. The face of the ribbon 13 coated with sealer 12 is placed in contact with the faying surface of the panel 14 so that the adhesive properties of the sealer 12 will hold the ribbon 13 in place for welding.

Then the other panel 15 is positioned so as to overlap the faying surface as seen in FIGURE 3 with the sealer 12 and ribbon 13 disposed therebetween.

Welding electrodes 16 are applied under the usual pressure. The electrode 16 carry the welding current so as to fuse the overlapping metal panels 14 and 15 at selected spots. The heat generated by the welding operation causes the sealer 12 to flow away from where the spot welds occur and to surround the spot welds so as to provide an effective seal for the entire joint between the metal panels 14 and 15.

The sealer 12 will hold the panels 14 and 15 in the desired relative position prior to full welding and at the same time assure a good electrical contact because of its conductive properties.

The ribbon 13 is preferably formed from a conductive material of very thin stock as, for example, either steel shim stock, zinc foil, or aluminum foil ranging from a thickness of .001 to .003 inch. These materials serve as a satisfactory carrier for the sealer 12 and also allow for the passage of welding current without increasing the resistance thereto. The ribbon 13 becomes an integral part of the joint during the welding operation.

The use of zinc foil or aluminum foil also offers galvanic protection within the joint which has the additional advantage of providing corrosion resistance.

Thin paper and plastic tapes may be substituted as a carrier for the sealer 12, but a higher voltage for welding will have to be applied to overcome the resistance offered by the tape.

In a specific illustration of this embodiment, a ⅛ inch bead of conventional sealer was applied to a ribbon of aluminum foil .625 inch wide and .001 inch thick. The sealer and foil were applied to the faying surface of a first steel panel having a thickness of .035 inch. A second steel panel of the same thickness was lapped over the faying surface of the first steel panel. The overlapped steel panels were spot welded at 2 inch intervals under the following welding conditions:

¼ inch weld face (electrode size)
550 lbs. electrode pressure
9 cycles weld time (1 cycle=1/60 sec.)
15 cycles squeeze time
15 cycles hold time
100% phase shift
11,000 amperes secondary current
4–5 secondary volts Another embodiment of the method of this invention is shown in FIGURES 6 and 7. A ribbon 17 is formed with spaced perforations 18 along the longitudinal center line as best seen in FIGURE 6. The perforations 18, which may take the shape of slits or holes, are to be of a size that will not permit the sealer 12 applied to the ribbon 17 to flow therethrough under the influence of gravity but still have to be large enough to allow sealer 12 to be squeezed therethrough under the clamping pressure applied during the spot welding operation as seen in FIGURE 7.

This embodiment has the advantages of assuring that the sealer 12 will be in contact with both body faying surfaces of the joint. Also, if the ribbon 17 is of a non-conductive material, the resistance to the passage of welding current will be substantially reduced as the sealer 12, if conductive, will provide for an electrical contact between the sheet panels 14 and 15.

In FIGURE 8 is seen a further embodiment in which the bead of sealer 12 is applied to each face of ribbon 13 prior to welding. This assures continuous and effective sealer protection for the entire length of the joint between the two metal panels 14 and 15 when joined by welding.

It can be readily seen that the bead of sealer can be applied manually or automatically to a moving ribbon in an off-line operation without interfering with the spot welding of metal sheets. This can be performed at a time and in a location that will not interfere with the assembly of sheet metal components. The ribbon with the sealer adhered thereto can be stored until needed for the welding operation. At the time of welding, the operator is able to pick up a proper length of ribbon and sealer and apply it to the faying surface of one or both sheet metal panels using the sealer as an adhesive to hold the ribbon and the sealer in position for welding. Upon welding the overlapping portion of the sheet metal panels, the sealer disposed between the panel will effect a continuous seal for the joint. This will substantially lower the cost of the sealing operation as the operator's time for applying the sealer during the welding operation is reduced. Also, the quality of the sealing operation is improved as dirt and water leaks due to incomplete sealing are eliminated.

It is to be understood that the method of this invention can be applied to a lap or coach joint and is not to be limited to the exact construction shown and described but that various changes and modifications may be made without departing from the spirit and scope of the invention as defined in the appended claims.

We claim:
1. A method for joining two metal sheets comprising th steps of placing sealer having adhering properties on a ribbon, applying the ribbon with the sealer adhered thereto to at least a portion of one of said sheets to adhere said ribbon to said sheet, positioning a portion of the other of said sheets in contact with said ribbon so that said ribbon and sealer are disposed between overlapping portions of said metal sheets, and passing a welding current through the overlapping portions of said metal sheets until joined together.

2. A method for joining two metal sheets comprising the steps of establishing a substantially continuous bead of a pasty material having adhesive and sealing properties on a continuous ribbon, applying the ribbon to the face of at least one of said sheets to adhere said ribbon to said sheet, positioning a portion of the other of said sheets in contact with said ribbon so that said ribbon and said pasty material adhered thereto are disposed between overlapping portions of said metal sheets, applying pressure to said overlapping portions and passing a welding current through the two sheets and said pasty material until said overlapping portions are fused to form a joint with the pasty material providing a seal for said joint.

3. A method for joining two metal sheets by welding comprising the steps of establishing a substantially continuous bead of sealer having adhesive properties on one face of a continuous ribbon, applying said sealer to a surface of at least one of said sheets to cause the adherence of said ribbon to said surface, placing the other of said sheets in contact with the other face of said ribbon so that said ribbon and sealer are disposed between overlapping portions of said metal sheets, applying pressure to and passing a welding current at spots selected for welding through the overlapping portions of the metal sheets until sufficient metal for the spot weld has fused between the sheets to form a joint therebetween with the sealer providing a continuous seal for the joint.

4. The method as described in claim 3 and which is further characterized in that said sealer also has conductive properties.

5. The method as described in claim 3 and which is further characterized in that said ribbon has spaced perforations so as to have portions of said sealer flow from one face of said ribbon to the other face of said ribbon when pressure is applied to said overlapping portions.

6. The method as described in claim 3 and which is further characterized in that said ribbon is conductive and is fused with the sheets when welding current is passed therethrough.

7. The method as described in claim 3 and which is further characterized in that said ribbon is aluminum foil.

8. The method as described in claim 3 and which is further characterized in that said ribbon is zinc foil.

9. The method as described in claim 3 and which is further characterized in that said ribbon is steel shim stock.

10. A method for joining two metal sheets by welding comprising the steps of establishing at least one substantially continuous bead of sealer having adhesive properties on each face of a continuous ribbon, applying said ribbon to a face of at least one of said sheets to adhere said ribbon to said sheet, placing the other of said sheets in contact with the other face of said ribbon so that said ribbon and sealer are disposed between overlapping portions of said metal sheets, applying pressure and passing a welding current at spots selected for welding through the overlapping portions of the metal sheets until sufficient metal for the spot weld has fused between the sheets to form a joint therebetween with the sealer providing a continuous seal for the joint.

11. A method for joining two metal sheets by spot welding comprising the steps of establishing a substantially continuous bead of sealer having adhesive and conductive properties on one face of a continuous ribbon, said ribbon being wide enough to accommodate said bead of sealer, cutting said ribbon to fit the length of a faying surface of one of said metal sheets, applying said sealer to said faying surface to cause the adherence of said ribbon thereto, placing the other of said sheets in contact with the other face of said ribbon so that said ribbon and sealer are disposed between overlapping portions of said metal sheets, applying pressure and passing a welding current at spots selected for welding through the overlapping portions of the metal sheets until sufficient metal for the spot weld has fused between the sheets to form a joint therebetween with the sealer providing a continuous seal for the joint.

References Cited
UNITED STATES PATENTS

| | | | |
|---|---|---|---|
| 1,677,161 | 7/1928 | Adams | 219—92 |
| 1,677,205 | 7/1928 | Pugh | 219—92 |
| 2,452,805 | 11/1948 | Sussenbach | 219—92 |
| 2,510,727 | 6/1950 | Sussenbach | 219—91 |
| 2,641,674 | 6/1953 | Orr et al. | 219—91 |
| 2,726,308 | 12/1955 | Cinamon | 219—92 |
| 2,902,589 | 9/1959 | Wirta | 219—92 |
| 3,214,564 | 10/1965 | Katzer et al. | 21—92 |

RICHARD M. WOOD, *Primary Examiner.*

W. D. BROOKS, *Assistant Examiner.*